April 1, 1941.  W. A. KROPP  2,236,824
HOSE TOWER
Filed July 8, 1937   13 Sheets-Sheet 1

Inventor.
Willis A. Kropp
By Williams, Bradbury,
McCaleb & Hinkle
Attys.

April 1, 1941. W. A. KROPP 2,236,824
HOSE TOWER
Filed July 8, 1937 13 Sheets-Sheet 2
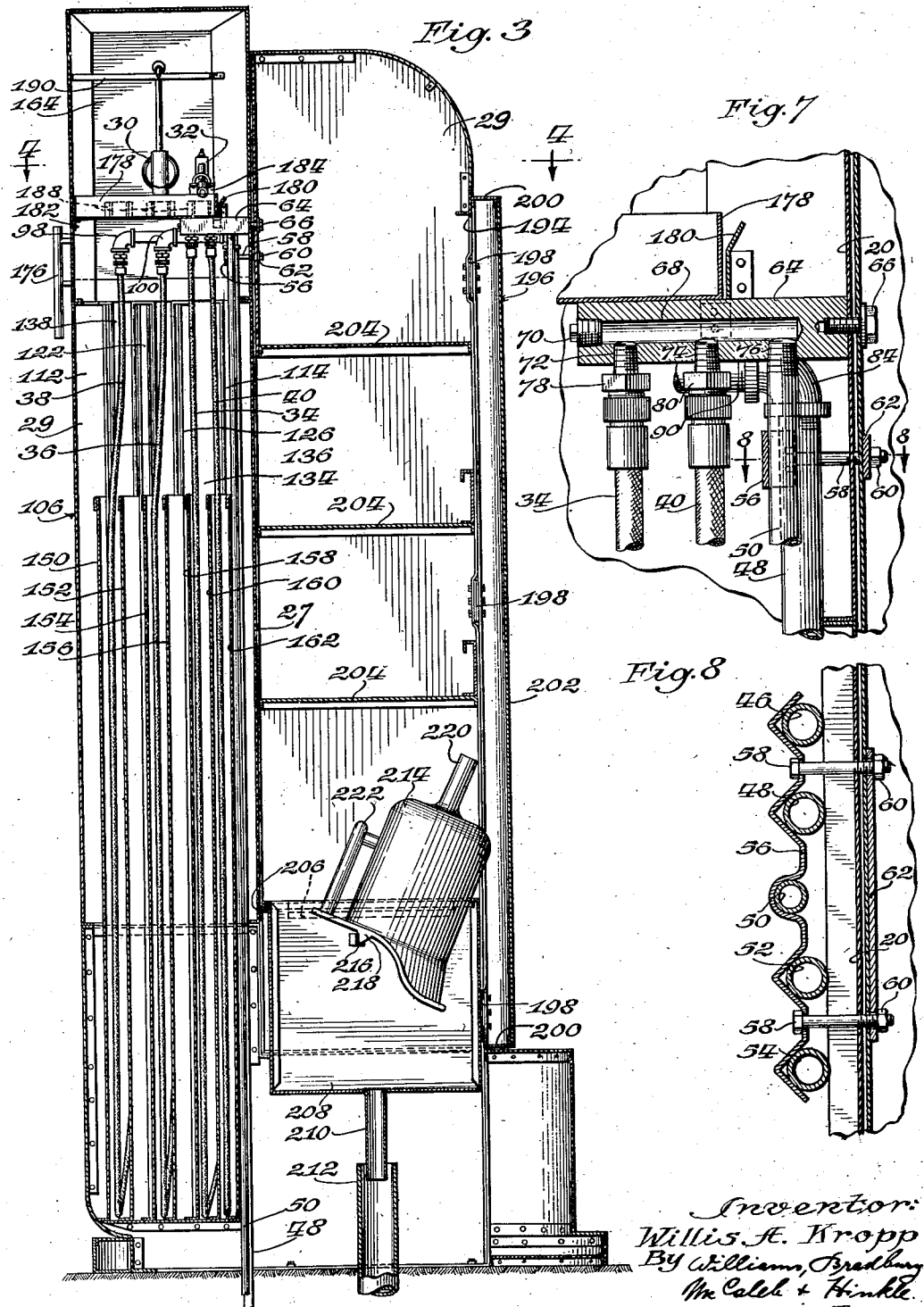
Inventor:
Willis A. Kropp
By Williams, Bradbury,
McCaleb & Hinkle
Attys.

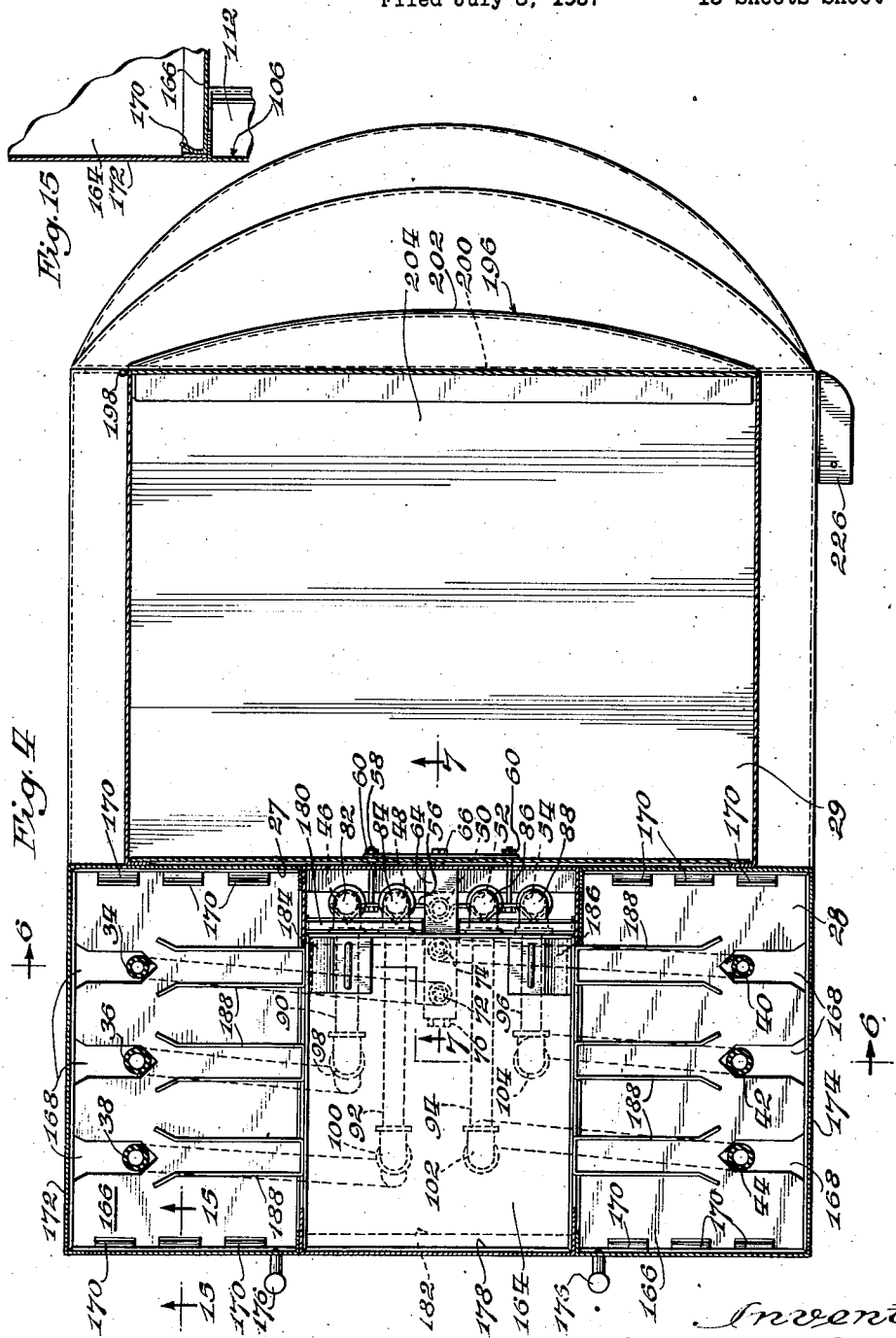

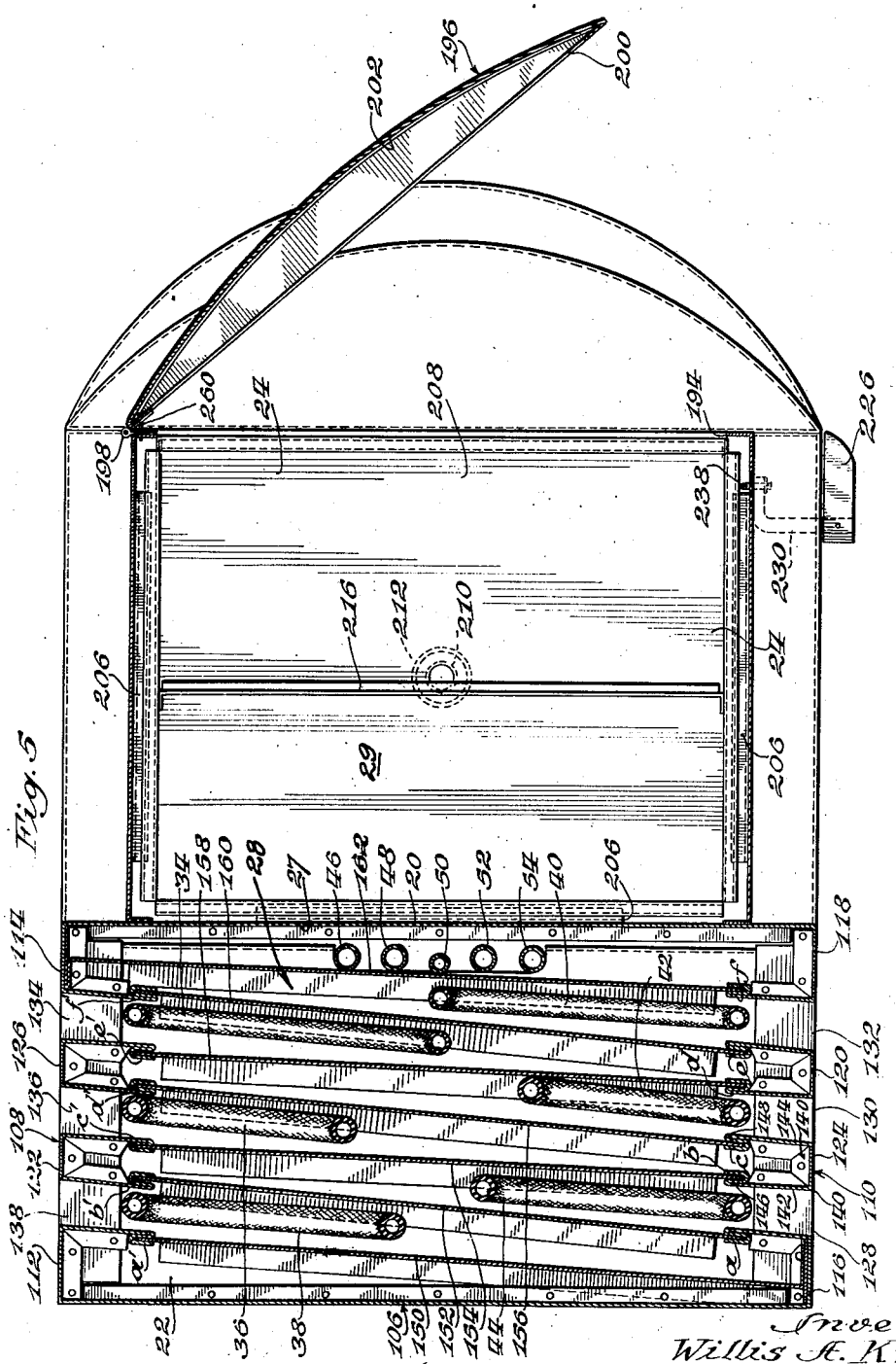

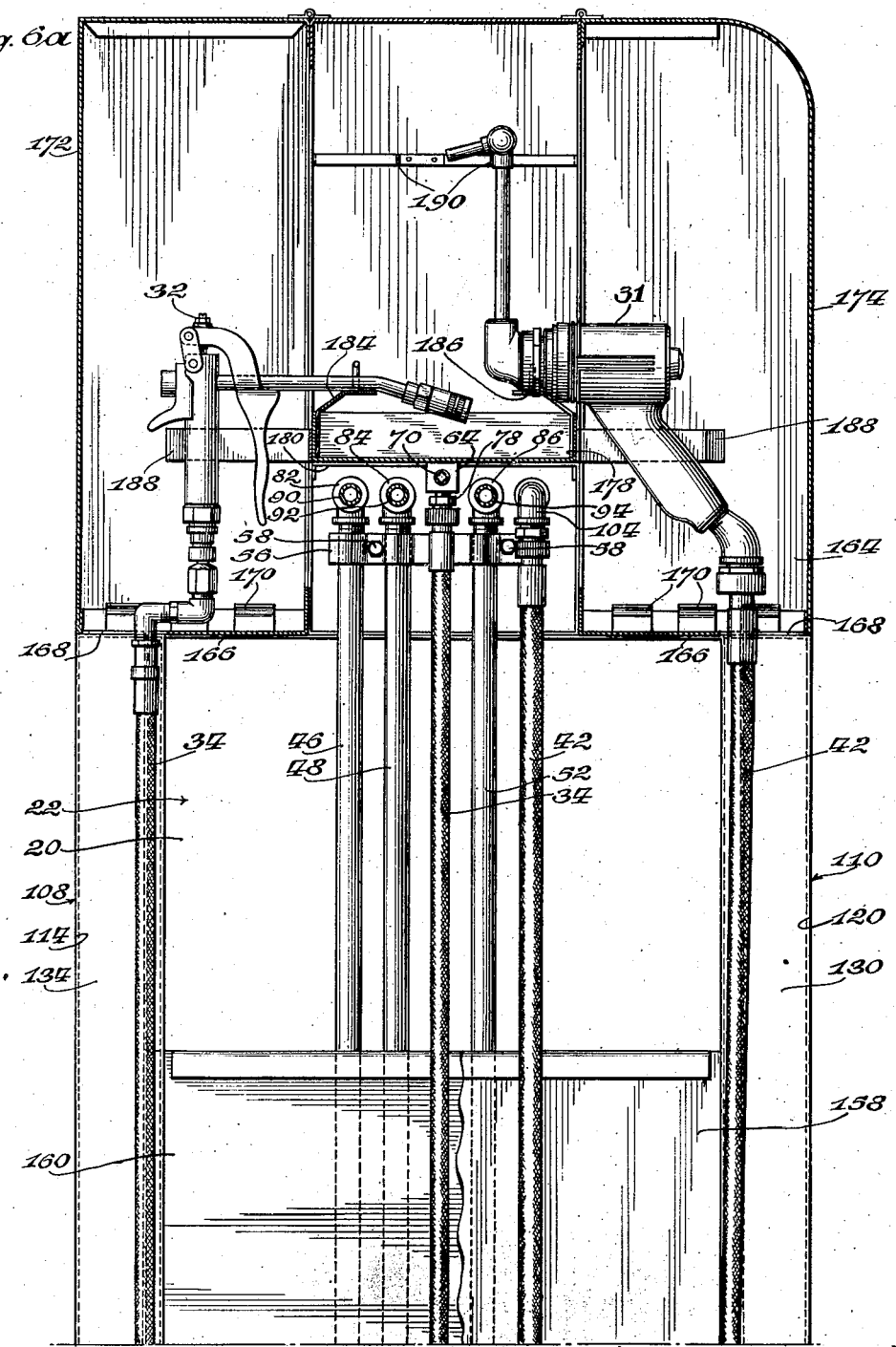

April 1, 1941. W. A. KROPP 2,236,824
HOSE TOWER
Filed July 8, 1937 13 Sheets-Sheet 6
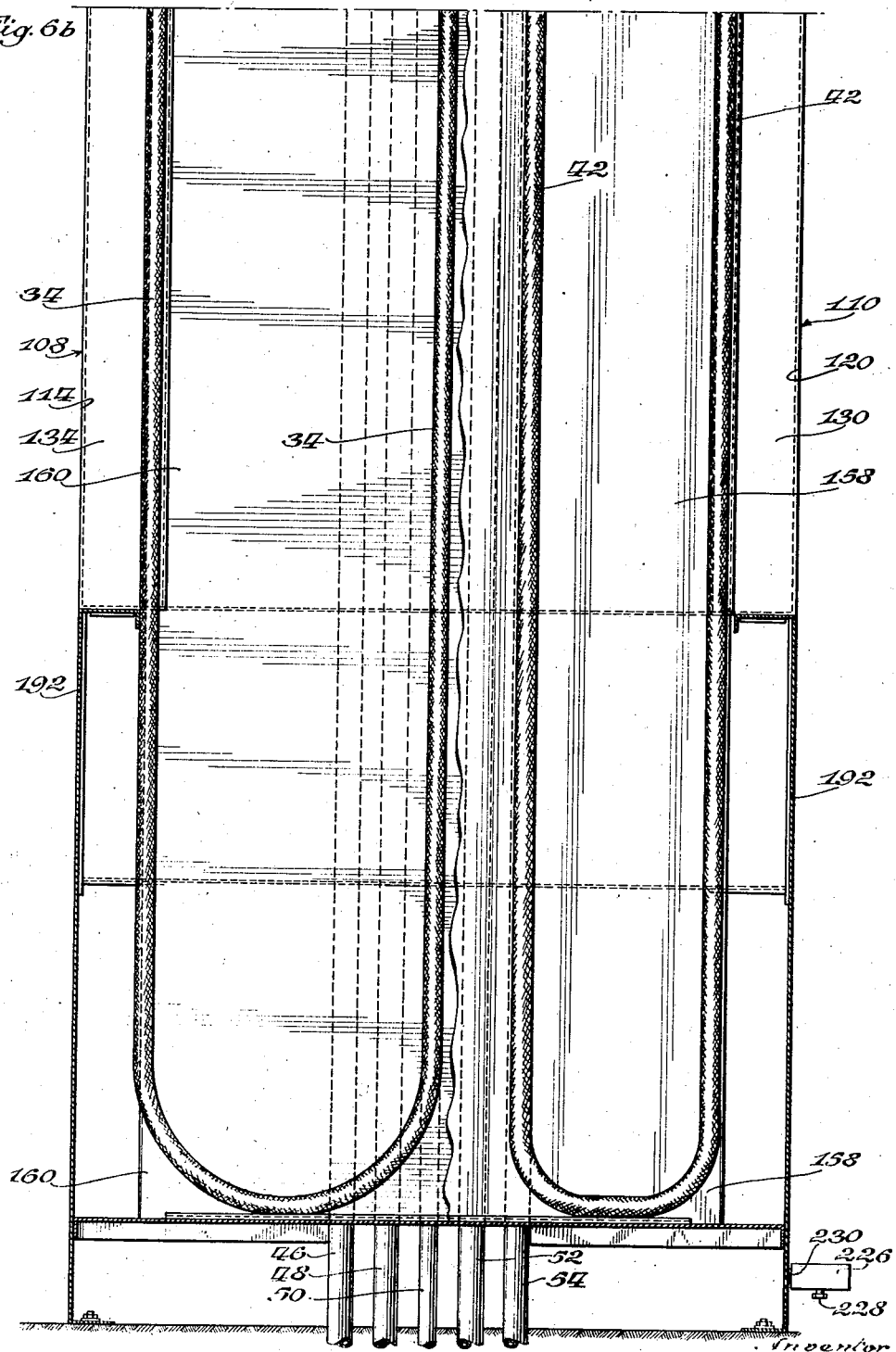

April 1, 1941.  W. A. KROPP  2,236,824
HOSE TOWER
Filed July 8, 1937  13 Sheets-Sheet 7
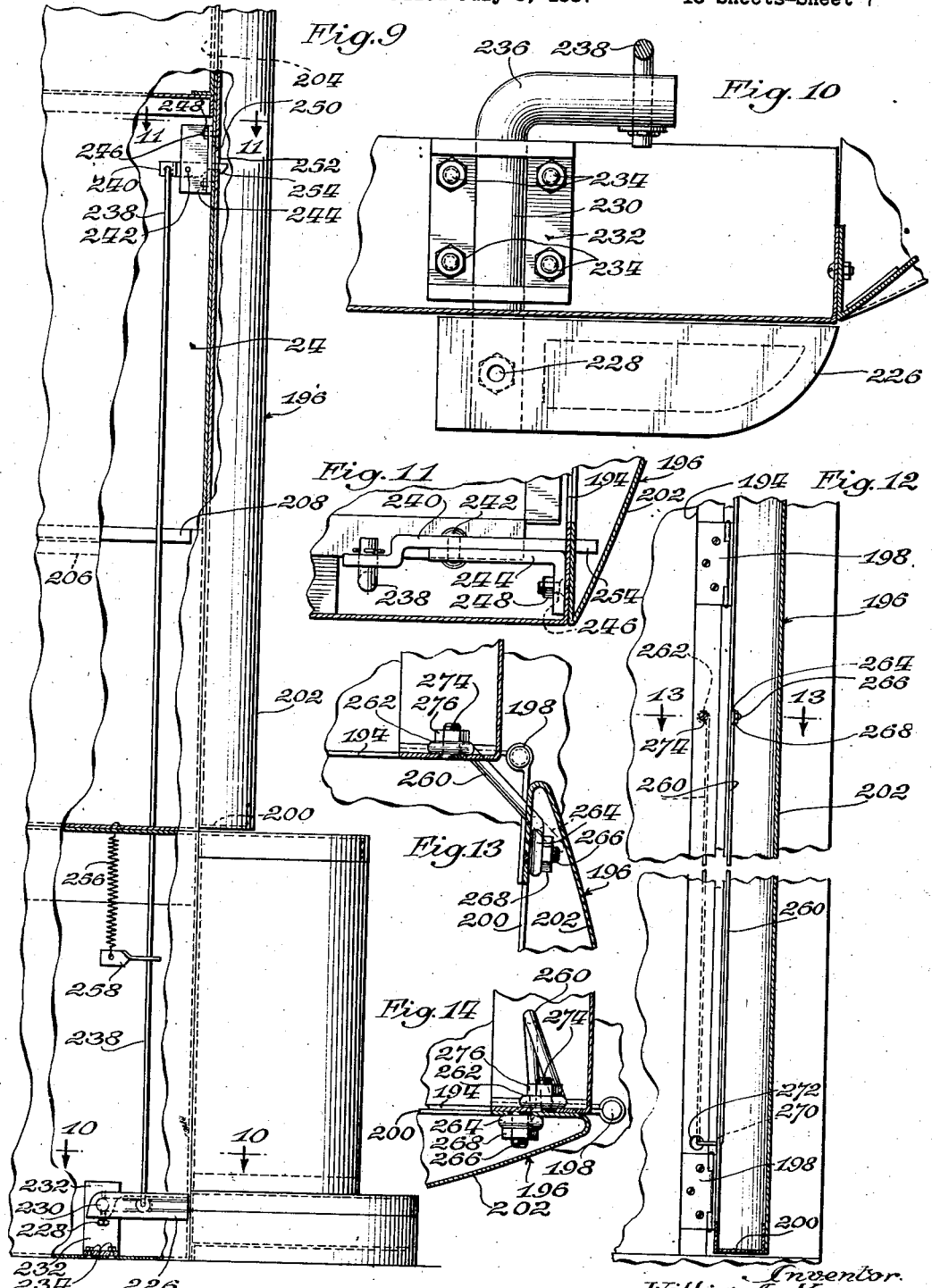

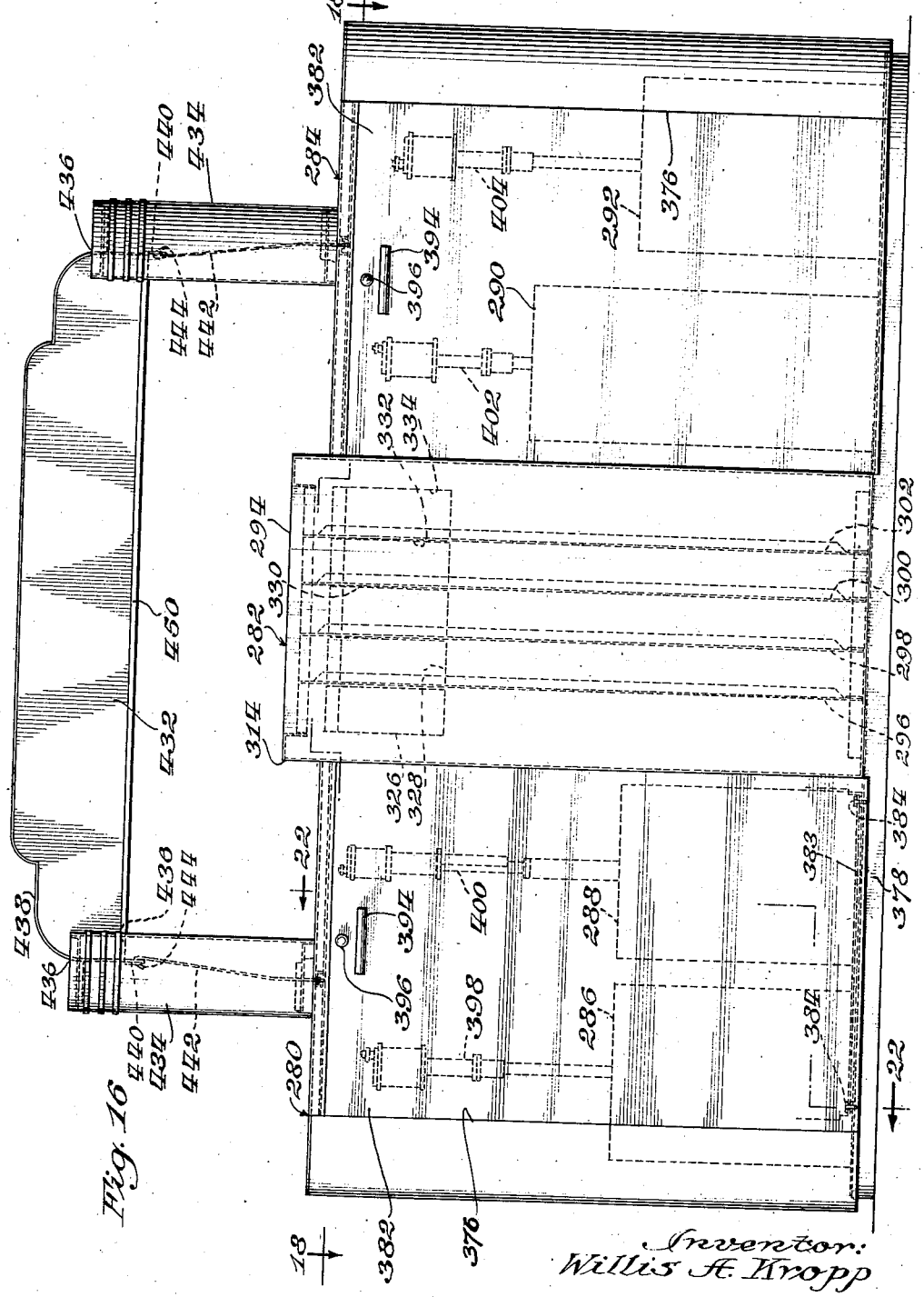

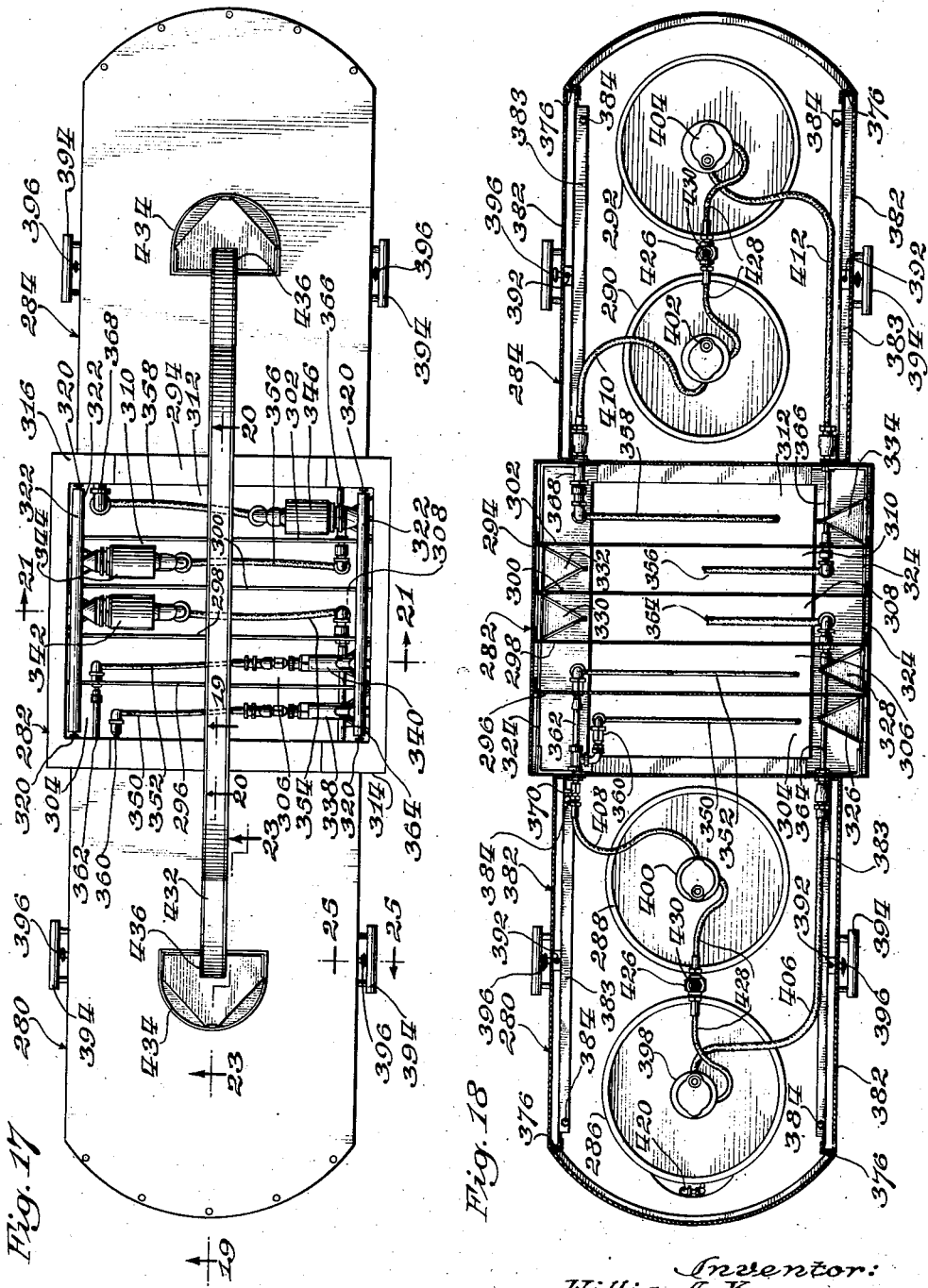

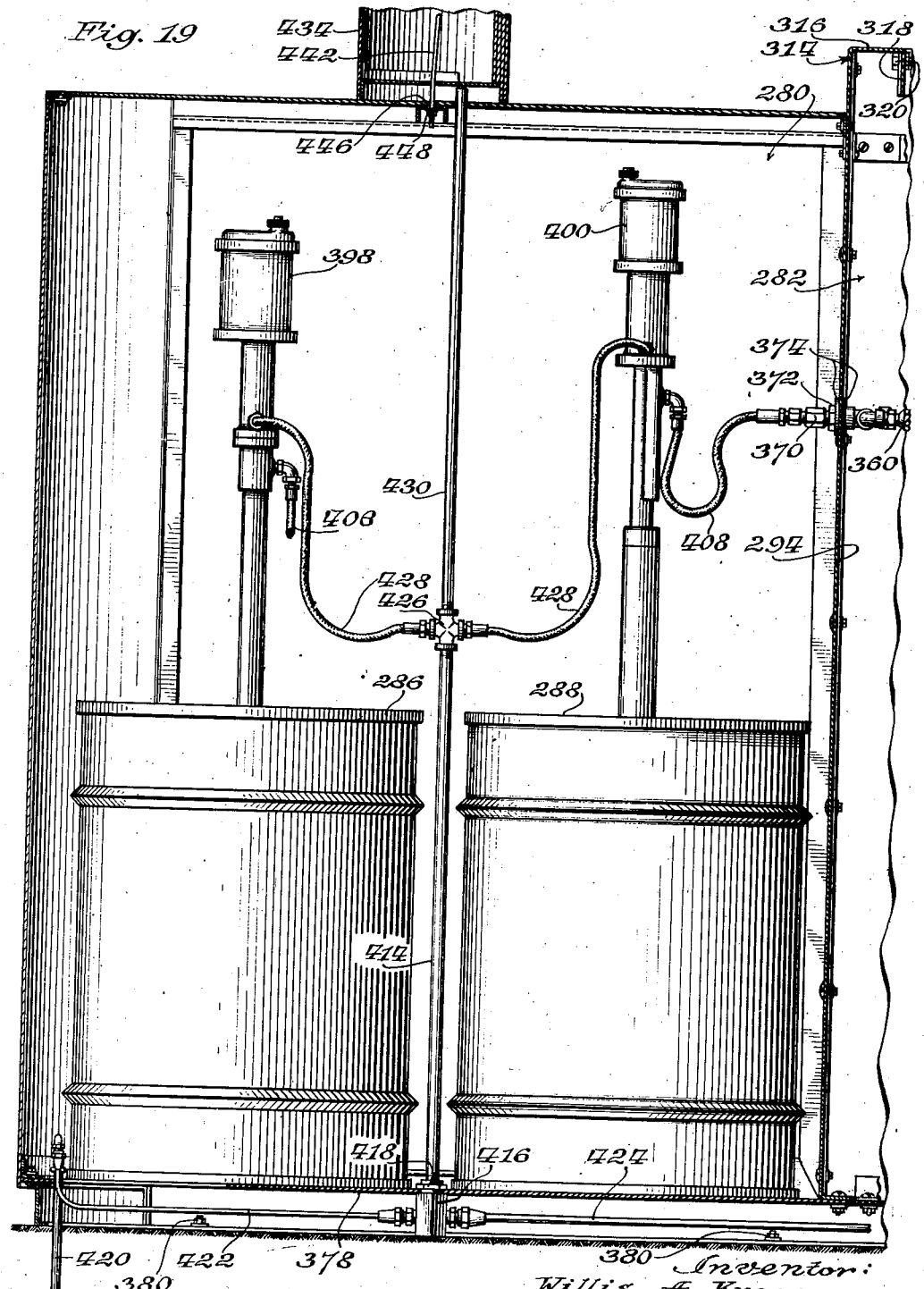

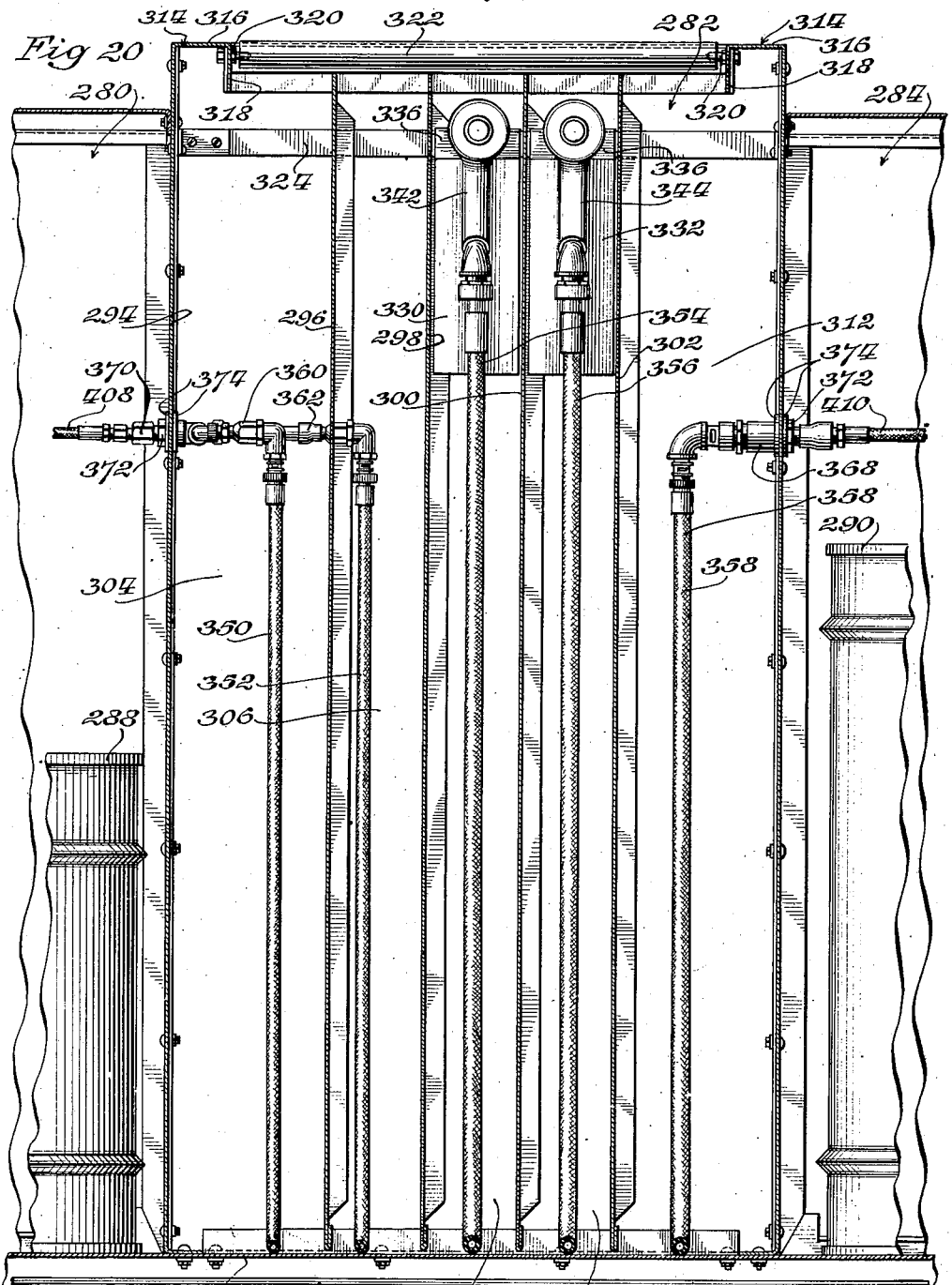

April 1, 1941.  W. A. KROPP  2,236,824
HOSE TOWER
Filed July 8, 1937  13 Sheets-Sheet 12
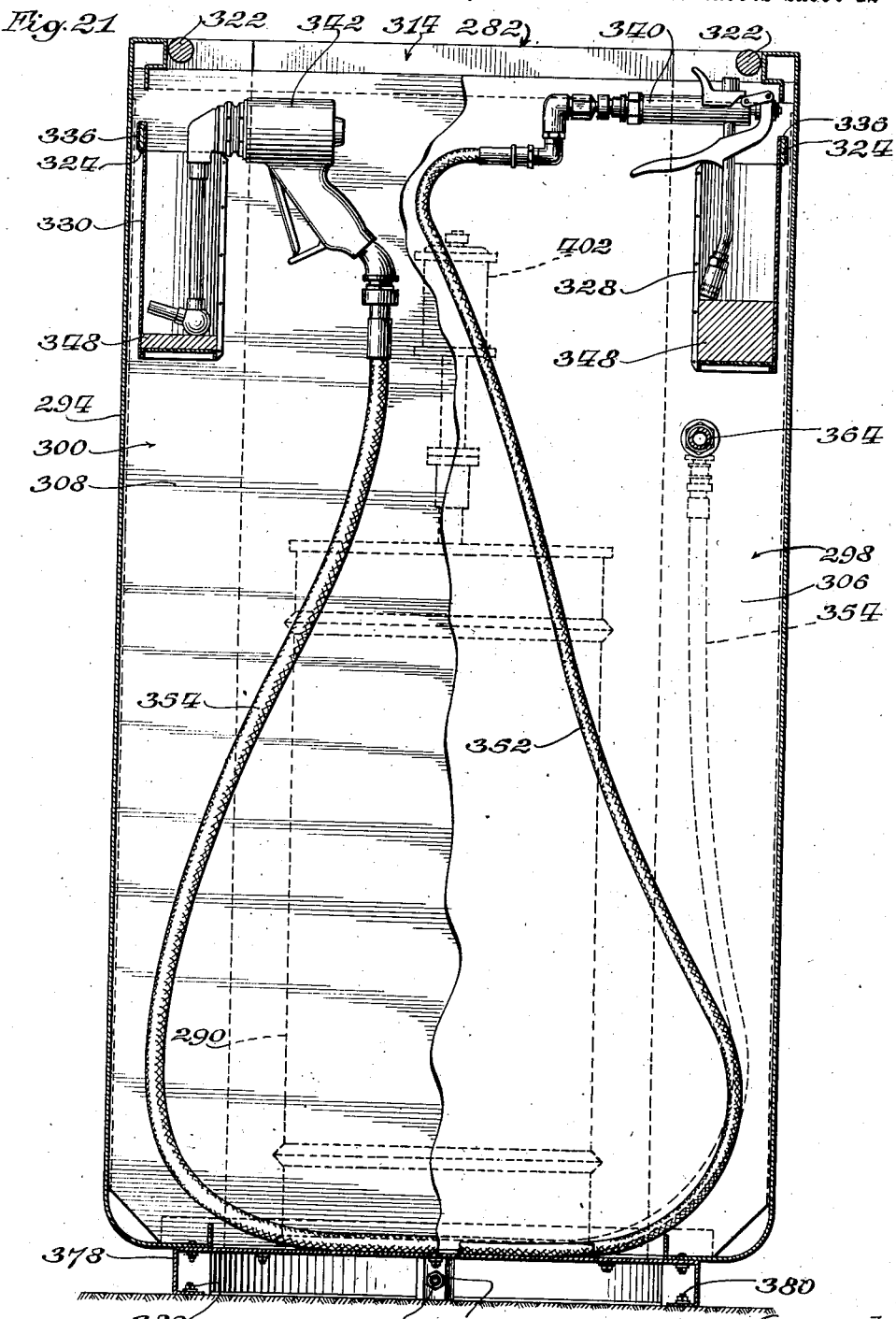

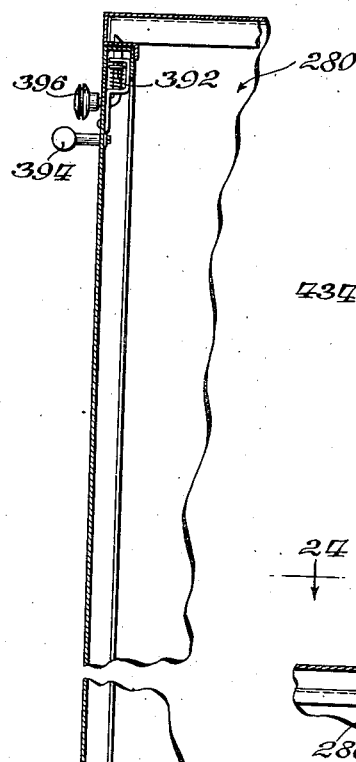
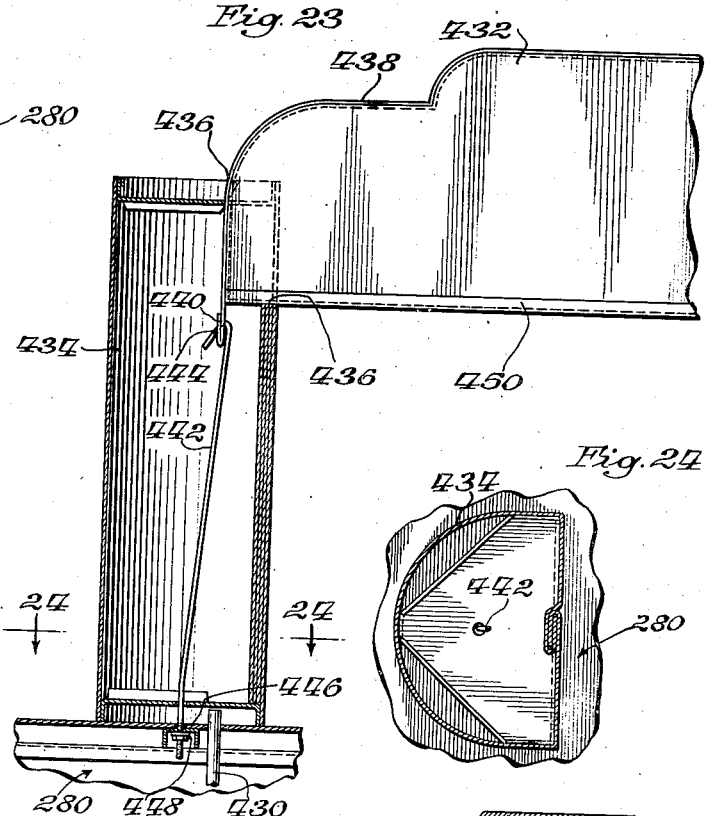
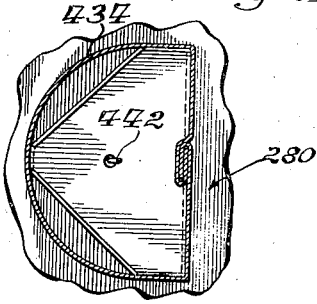
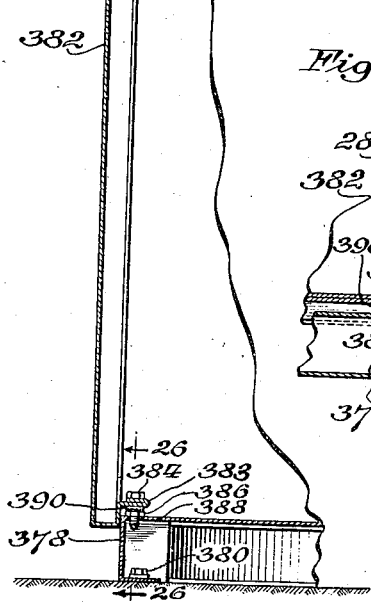
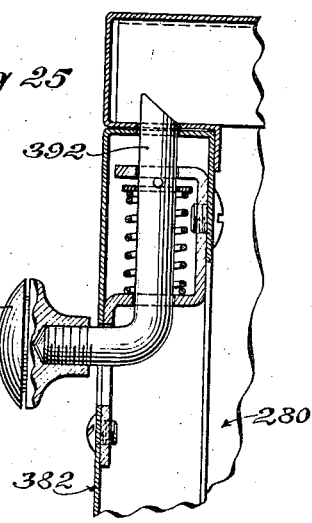

Patented Apr. 1, 1941

2,236,824

UNITED STATES PATENT OFFICE 2,236,824

HOSE TOWER

Willis A. Kropp, Oak Park, Ill., assignor to Stewart-Warner Corporation, Chicago, Ill., a corporation of Virginia Application July 8, 1937, Serial No. 152,573

10 Claims. (Cl. 221—68)

This invention relates to hose towers, and particularly to the mechanical features thereof, since a tower of this nature may be made in many pleasing designs, three of which are disclosed in my design applications, Serial Nos. D-68,563, D-68,564, and D-68,565.

In recent years it has become increasingly common to install in lubricating departments, grease and oil pumps which dispense lubricants from the original drums. Because these pumps and drums are large and difficult to move, it is necessary that they be relatively permanently located, and have rather long flexible hoses to enable the operator to reach the various parts of the automobile to be lubricated. The disposal of this hose, when not in use, has become an increasingly difficult problem, especially so since this type of hose is comparatively stiff and heavy, inasmuch as it must be of large diameter, to permit free flow of the lubricant, and must be constructed to withstand high pressures. The problem is aggravated by the fact that frequently more than one lift or rack, where lubrication is carried on, is served by the same group of pumps, so that even longer hoses are necessary in order to be able to reach more than one automobile with the same hose.

Much attention is given to the neat and attractive appearance of lubrication departments, but the only way that has been at all satisfactory for disposing of the hoses is to coil them up and to hang them on the various pumps with which they are connected. Even when the hoses are clean, this treatment lends an untidy atmosphere to an otherwise neat and attractive lubrication department. When the hoses become soiled, from being dragged along the floor, the situation is even worse.

For hoses of the type used in this kind of work, hose reels are not very satisfactory. This is because these hoses are heavy and bulky, and because the hoses are normally stored under the full pressure developed by the pumps. Under these conditions the hoses are very stiff and, consequently, an elaborate, large, strong and expensive hose reel would be required. Hose reels which would function satisfactorily would be too large to be convenient, and far too expensive to be purchased by the ordinary lubrication department owner.

With the above in view, it is an object of this invention to provide improved means to store a plurality of lubricant dispensers and hoses.

Another object of this invention is to provide a neat and inexpensive cabinet or tower that will contain and support a plurality of lubricant dispensers or guns and their attached hoses.

A further object is to provide novel means to contain several lubricant dispensers so that their several hoses will be kept straight and separated from each other.

A further object is to provide a novel and inexpensive tower that provides a neat arrangement on the interior for the lubricating devices, and from which the proper lubricating devices may be withdrawn without loss of time.

A further object is to provide new and improved means for containing the several lubricant hoses, substantially hidden from view, but which offers practically no resistance to the insertions or withdrawal of the hoses.

A further object is to provide novel means for securing together the various parts of the hose tower or cabinet.

A further object is to provide a substantial and inexpensive hose tower that is attractive to the eye.

Further objects and advantages will appear hereafter in the specification.

In the drawings:

Fig. 3 is a longitudinal sectional view of the tower taken in the direction of the arrows along the line 3—3 of Fig. 1;

Fig. 4 is a sectional view through the tower taken in the direction of the arrows along the line 4—4 of Fig. 3;

Fig. 5 is a sectional view through the tower taken in the direction of the arrows along the line 5—5 of Fig. 1;

Fig. 6a is a longitudinal sectional view of the top half of the tower taken in the direction of the arrows along the line 6—6 of Fig. 4;

Fig. 6b is a continuation of Fig. 6a showing the lower half of the tower;

Fig. 7 is a fractional sectional view taken in the direction of the arrows along the line 7—7 of Fig. 4;

Fig. 8 is a fractional sectional view taken in the direction of the arrows along the line 8—8 of Fig. 7;

Fig. 9 is a fractional plan view of the lower left side of the tower with the outside wall partly broken away to show the door latch mechanism;

Fig. 10 is a fractional sectional view of the tower taken in the direction of the arrows along the line 10—10 of Fig. 9;

Fig. 11 is a fractional sectional view of the tower taken in the direction of the arrows along the line 11—11 of Fig. 9;

Fig. 12 is a fractional sectional view of the tower showing the door opening mechanism;

Fig. 13 is a fractional sectional view of the cabinet and door taken with the door open and in the direction of the arrows along the line 13—13 of Fig. 12;

Fig. 14 is a view similar to Fig. 13 showing the door closed;

Fig. 15 is a fractional sectional view of the tower taken in the direction of the arrows along the line 15—15 of Fig. 4;

Fig. 16 is a front elevational view of an alternative embodiment of my invention;

Fig. 17 is a plan view of the hose cabinet illustrated in Fig. 16;

Fig. 18 is a horizontal sectional view taken in the direction of the arrows along the line 18—18 of Fig. 16;

Fig. 19 is a vertical sectional view taken in the direction of the arrows along the line 19—19 of Fig. 17;

Fig. 20 is a vertical sectional view taken in the direction of the arrows along the line 20—20 of Fig. 17;

Fig. 21 is a vertical sectional view taken in the direction of the arrows along the line 21—21 of Fig. 17;

Fig. 22 is a vertical sectional view taken in the direction of the arrows along the line 22—22 of Fig. 16;

Fig. 23 is a vertical sectional view taken in the direction of the arrows along the line 23—23 of Fig. 17;

Fig. 24 is a horizontal sectional view taken in the direction of the arrows along the line 24—24 of Fig. 23;

Fig. 25 is a vertical sectional view taken in the direction of the arrows along the line 25—25 of Fig. 17, showing in detail the door latch mechanism;

Fig. 26 is a vertical sectional view taken in the direction of the arrows along the line 26—26 of Fig. 22.

In the accompanying drawings forming a part of this specification, and in which like numerals designate like parts throughout the several views:

Figure 1:
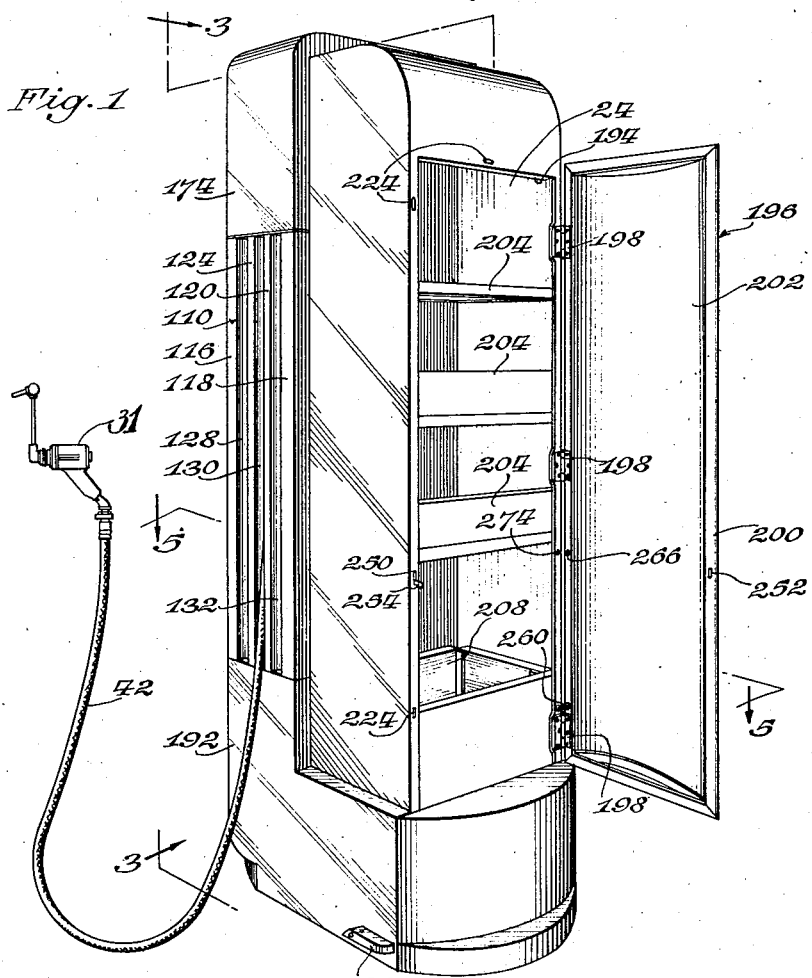
Fig. 1 is a left front perspective view of the tower showing a gun and hose withdrawn therefrom.
Figure 2:
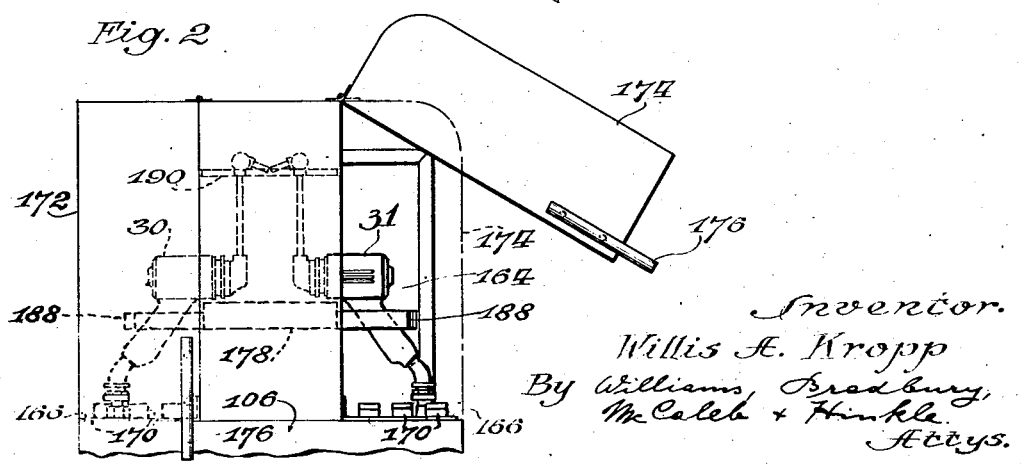
Fig. 2 is a back elevational view of the top of the cabinet with one of the covers lifted.

In one embodiment of my invention, illustrated in Figs. 1 to 15, inclusively, the tower in general consists of an upright structure preferably built from sheet steel sections that are fabricated in dies and then welded or otherwise suitably secured together to form a unitary whole.

On the inside the tower is divided by the partition 27 into two separate compartments 28 and 29 (Figs. 3, 4 and 5), the first of which 28 occupies the back portion and is provided with means to support and store a plurality, in this instance 6, of lubricator dispensers, grouped three on each side. Only three of these dispensers, 30, 31 and 32, are here shown, since the others are similar. Each of these dispensers is connected to one of the six lubricant conducting hoses 34, 36, 38, 40, 42 and 44 which depend in loops to the floor of the tower and back to the top where each hose is connected to one of the lubricant supplying pipes 46, 48, 50, 52 and 54 by means to be described later.

In the embodiment here shown it is intended that two of the dispensers 32, one of which is located on each side, are of the type designed to be connected to high pressure lubricating fittings, while the other four, two of which are shown 30 and 31, supply metered lubricant at low pressure, such as for filling transmissions and differentials. Each of these low pressure dispensers may be connected to a reservoir supplying a different variety of lubricant.

Five lubricant conducting pipes 46, 48, 50, 52 and 54 pass vertically through the tower adjacent the partition 27 and are secured near their upper ends by the clamp 56 which is held to the partition by means of two bolts 58, nuts 60, and a reinforcing strip 62 which extends between the bolts 58. The upper end of the central pipe 50 which conducts the chassis lubricant under high pressure is screwed into a manifold 64 secured to the partition 27 by the bolt 66. The manifold 64 consists of a heavy square steel bar having a longitudinal deep recess 68, the end of which is closed by the pipe plug 70. Communicating with this recess are three tapped holes 72, 74 and 76 into two of which 72 and 74 are fitted the hose connection 78 and 80 secured to the high pressure grease conduits 34 and 40. The third opening 76 is fitted to the pipe 50, which supplies the high pressure lubricant to the manifold 64, hose lines 34 and 40, and dispensing gun 32.

The other four pipes 46, 48, 52 and 54 communicate by means of elbows 82, 84, 86 and 88, nipples 90, 92, 94 and 96, and elbows 98, 100, 102 and 104, to each of the low pressure hoses 36, 38, 44 and 42 leading to the low pressure metering dispensers represented by the numerals 30 and 31. Although in the drawings the pipes 46, 48, 50, 52 and 54 are shown as entering the tower from below, it should be understood that these pipes may enter from above or from the sides or back, if desirable.

The rear section 28 that contains the above pipes, hoses, and dispensers, consists of a cabinet having a back 106 and sides 108 and 110, the front being closed by the partition 27.

The sides 108 and 110 consist of corner sections 112, 114, 116 and 118 and two vertical strips on each side 120, 122, 124, 126 between the corner posts so proportioned that the three spaces between the strips on each side 128, 130, 132, 134, 136 and 138 are substantially equal in width to the width of the strips, thereby providing each side of the tower with three vertical slots in its wall.

The four strips 120, 124, 126 and 122 noted above are the central portions of U-shaped members, the description of only one of which will be given here, since all are alike.

The U-shaped member 140 has flanges 142 and 144 that extend inwardly for a few inches, the ends of these flanges being bent back upon themselves inside the member and then outwardly, thereby providing slots 146 and 148 in their ends.

The corner sections 112—114, 116 and 118 are likewise provided with similar inwardly extending flanges at the edge of the first slot away from each corner. However, these inwardly extending flanges are not perpendicular to the outside face, but are slightly canted so that if starting from the back wall the flanges are given indicia $a$, $b$, $c$, $d$, $e$ and $f$ on one side, and $a'$, $b'$, $c'$, $d'$, $e'$ and $f'$ on the other, the flange $a$ is substantially in line with the flange $b'$, the flange $b$ in line with $c'$ and so on so that all the flanges are substantially parallel to each other, but canted with respect to a vertical plane normal to the sides of the tower.

Inside the tower the six slots 128, 130, 132, 134, 136 and 138 are separated by partitions 150, 152, 154, 156, 158, 160, and 162 which are secured by the slots 146 and 148 in the ends of the flanges, so that the partition 152 extends between flange *a* on one side and *b'* on the other and so on, excepting that the two end partitions 150 and 162 are secured at one end by their respective slots *a'* and *f*, while their opposite ends extend against the side walls and are folded over twice so as to position the two partitions 150 and 162 parallel to each other and to partitions 154 and 158.

It should be noted that although the flanges *a, b, c, d, e, f, a', b', c', d', e',* and *f'* are substantially parallel, yet because the slots 146 and 148 are inside the U-shaped portion, adjacent partitions 150, 152, 154, 155, 160 and 162 will be at a slight angle to each other thereby providing a wider space in the entrance than farther back in the several slots 128, 130, 132, 134, 136 and 138.

Above the partitioned section just described is a box-like section 164 having on each side a floor 166 with three slots 168, each coinciding with one of the slots 128, 130, 132, 134, 136 and 138.

The ends of these floors 166 toward the front and rear of the tower are provided with a plurality of upwardly and inwardly extending clips 170 that serve to center two hinged covers 172 and 174 when in their lowered position. These covers 172 and 174 serve to close the box-like section 164 when lowered and give access to the lubricator dispensing guns when raised by the handle 176.

In the center of the section 164 above the lubricator conducting manifold 64 and other piping is a tray 178 which rests upon the brackets 180 and 182 secured to the walls of the tower and serves to catch the drippings from the several dispensers 30, 31, and 32. The tray 178 is provided on each side with three upstanding rests 184 and 186 to carry the weight of the dispensing guns and three outwardly extending clips 188 to grip the gun handles.

To provide additional support for the low pressure metering dispensers 30 and 31, two bars 190 extend across the chamber 164 above the pan 178.

As will be seen, each dispenser is supported within the tower with its opening over the drip pan 178, while its hose depends in a loop to the floor being then brought up and connected to one of the lubricator supply pipes, and since each length of hose is separated from the adjacent hose by one of the partitions 150, 152, 154, 156, 158, 160 and 162, no tangling will result.

To keep the lower portions of the hose loops inside the tower, approximately the lower one-third of the slots 128, 130, 132, 134, 136 and 138 are closed by the side panels 192.

Since the edges of the hose slots will cast shadows into the openings, the hose will be relatively unobtrusive and this effect may be inhanced by providing chromium plated or highly polished edges for these slots.

The front section 29 of the tower is provided with a rectangular opening 194 closed by a door 196 supported on hinges 198. The door 196 consists of a rectangular steel frame 200 supporting a convex door panel 202 which gives a pleasing design to the tower and greater usable space within the cabinet than would a flat door.

Behind the rectangular opening 194, the cabinet space 29 is provided with shelves 204 which may be used to hold tools or other accessories frequently necessary during a lubricating operation. The lower portion of this cabinet has horizontal brackets 206 on its three walls that support a removable square funnel or sink 208, a spout 210 of which projects a short distance into a pipe 212 leading to a reservoir, not shown. A pitcher 214 used to catch crank case drainings is supported in an inverted position in the sink 208 by a cross rod 216 attached to the sides thereof, so that the pitcher 214 may drain into the sink 208 and thence through the spout 210 and pipe 212 into the reservoir communicating with the pipe 212. The pitcher 214 is provided on its rim with triangular projections 218 that engage the cross rod 216 and serve to position the pitcher within the mouth of the sink 208. Since this pitcher 214 has a capacity of slightly over two gallons, a stem 220 extending downwardly from its bottom is provided to serve as a second handle to be held in the left hand of a normally right handed person while a handle 222 at the side may be held in the right hand, thus making it easy to hold the pitcher upright while carrying the load of drainings from the car being serviced to the sink 208. The stem 220 also fits into a complementary bracket clamped to a rail of an automobile lift, and serves to support the pitcher 214 when located beneath the oil drain of an automobile.

The face of the cabinet against which the door 196 closes is provided with bumpers 224 that may be made of any suitable material such as rubber or felt. Alongside the tower near the lower left corner is a foot pedal 226 held by the set screw 228 to the end of a crank arm 230 that projects from the tower and is journaled in the bearing bracket 232 secured to the floor by bolts 234.

Swivelably secured to the horizontal forwardly extending cranked portion 236 of the arm 230 is an upwardly extending control rod 238 which at its upper end is similarly connected to a door latch plate 240. The latch plate 240 is pivotally secured near its center by a rivet 242 that extends through a bracket 244 held to the forward surface of the tower by the screws 246 and nuts 248. The forward end of the latch plate 240 is cut away on its lower surface and extends through a slot 250 in the tower wall which coincides with a similar slot 252 in the door frame 200 when the door is closed, and ends with a triangular projection 254 on its lower surface. This projection 254 acts as a catch cooperating with the door slot 252 to secure the door when closed. A spring 256 connected between the cabinet and the rod 238 by means of an adjustable clutch plate 258 that binds against the rod 238 when canted by the spring 256, urges the rod 38 upward and the coacting latch 254 downward.

From the above it will be seen that when the door 196 is closed the latch 254 will be held in the lower end of the slot 252 by the spring 256, thereby latching the door 196 shut. When the foot pedal 226 is depressed, the latch 254 will be raised and will allow the door 196 to swing open.

To open the door 196 automatically when the latch 254 is released, a spring 260 is provided. This spring 260 consists of a long narrow U-shaped spring steel rod with the ends bent into eyes 262 and 264. One of these eyes 264 is in the plane of the U-shaped rod while the other 262 is at approximately 45 degrees to this plane, as shown by the broken line in Fig. 13.

When the spring 260 is assembled into the tower, the eye 264 is secured to the door frame 200 adjacent the hinges 198 by a bolt 266 and nut 268. The spring 260 then extends downwardly and at the central portion of the U passes through aligned openings 270 and 272 in the door frame 200 and in the face of the tower. From the openings 270 and 272 the spring 260 extends upwardly and has its other eye 262 secured to the wall of the cabinet by bolts 274 and nuts 276.

When the door 196 is closed and held by the latch 254, the spring 260 will have considerable potential energy, so that when the pedal 226 is depressed lifting the latch 254, the door 196 will be swung open by this spring 260.

In operation, the tower with its plurality of lubricant dispensers is set up with the pipes 46, 48, 50, 52, and 54 connected to their respective lubricant supplies and the pipe 212 leading to a reservoir to contain crank case drainings.

When one of the dispensers is desired, the cover 174 or 172 on the proper side is lifted by the handle 186 and the gun withdrawn, whereupon the cover may be dropped back into position and the hose attached to the gun drawn from its slot in the tower as shown in Fig. 1.

To return the gun to the tower the cover is again lifted and the gun placed in its proper clip 188 with the hose back in its slot with its loop tucked behind the panel 192.

As has been explained, the door 196 is opened by depressing the foot pedal 226 thereby giving access to the accessories contained therein and to the crank case drainings sink 208 and pitcher 214.

In the embodiment of my invention illustrated in Figs. 16 to 26 inclusively the hose cabinet or tower consists in general of three compartments 280, 282 and 284. The two end compartments 280 and 284 provide space for lubricant containing drums 286, 288, 290 and 292, while the grease hoses and dispensing guns are stored in the center section 282.

The center compartment 282 consists of a rectangular metal cabinet 294 divided transversely by means of vertical panels 296, 298, 300 and 302, into five narrow slots 304, 306, 308, 310 and 312 extending from near the top of the cabinet 294 to the bottom thereof. The two outside slots 304 and 312 are somewhat wider than the others, since a portion of their width is cut off by a top finishing and strengthening edge 314. The edge 314 is made by bending the top of the cabinet 294 inwardly at 316 for a short distance on all sides and then downwardly at 318 thereby providing a smooth edge for the top of the cabinet, as well as adding rigidity to the structure.

The downwardly extending portion 318 of the finishing edge 314 has secured thereto on each side near the front and rear of the cabinet, removable inwardly extending bearing pins 320. Between opposite pins 320, rollers 322 are rotatably mounted, so that one of these rollers 322 extends lengthwise along the front of the cabinet 294 slightly behind the inner surface of the finishing edge 314, while another roller 322 is similarly situated along the rear of the cabinet. The top surfaces of these rollers 322 project slightly above the top of the cabinet 294 for a purpose to be described later.

Beneath each roller 322 a flat metal strip 324 extends from side to side of the cabinet 294. These strips 324 are spaced somewhat from the front and back of the cabinet 294, and support triangular cups 326, 328, 330, 332 and 334 by means of their respective hooks 336. These cups serve to support lubricant dispensing guns 338, 340, 342, 344 and 346, and catch the drippings therefrom. Each gun is inserted into its proper cup with its lower end resting upon a triangular wooden block 348 placed in the bottoms of each cup. These blocks 348, which are otherwise alike, vary in thickness depending upon the length of the gun they support, Fig. 21.

One of the above cups is hooked over the bar 324 toward the front of the cabinet in each of the slots 304, 306 and 312, while the bar 324 in the rear of the cabinet supports cups in slots 308 and 310.

Each of the guns 338, 340, 342, 344 and 346 has connected thereto a lubricant conducting hose 350, 352, 354, 356 and 358 respectively. These hoses depend in loops to the bottom of the cabinet 294 and have their other ends connected to lubricant supply pipes 360, 362, 364, 366 and 368 respectively. The pipes 366 and 368 extend through the cabinet wall to the right into the compartment 284, while the pipe 364 extends through the cabinet wall to the left into the compartment 280. The pipes 360 and 362 are connected together and to a pipe 370 which also extends through the wall to the left into the chamber 280. These pipes are provided with nuts 372 and washers 374, where they pass through the wall between the compartments, for the purpose of securing them rigidly in place.

The compartments 280 and 284, which are also fabricated from sheet metal, and contain the lubricant drums 286, 288, 290 and 292 are provided with rectangular openings 376 in both front and rear through which the drums may be moved into and out of place. The whole cabinet rests upon and is secured to a base 378 of channel iron which may be bolted to the floor of the lubricating room by bolts 380.

The openings 376 are closed by doors 382 which are formed from a sheet of metal the top and sides of which are folded backwardly and inwardly to provide a smooth edge and a stiffer section, while the bottom edge is folded backwardly, inwardly, backwardly, and then over upon itself, thus providing a horizontal strip 383 slightly above and behind the bottom edge of the door. Two cap screws 384 extend downwardly through each of these strips 383 and are secured thereto by nuts 386. When the door is in place, each of these screws 384 registers with a vertical hole 388 in the upper surface of the base 378. To raise and lower the door 382 with respect to the base 378, washers 390 may be placed upon the cap screws 384 to space the nuts 386 from the strip 383.

Near the top center of each door 382 a snap latch 392 is provided which engages a notch in the top of the compartments 280 and 284 when the door is in place. A handle 394 also may be secured to the door, to aid the operator in handling this member.

To secure the doors 382 to the compartments 280 and 284, the door is tilted inwardly at the bottom and the ends of the screws 384 inserted into the holes 388. The top of the door is then swung into place, where it is held by the latch 392. In removing the doors, a knob 396 secured to the latch 392, is pulled downwardly, thereby disengaging the latch 392. The top of the door 382 is then pulled outwardly, in which position the door may be lifted out of engagement with the base 378 and removed to one side.

Each of the lubricant drums 286, 288, 290 and 292 is provided with a pneumatically driven pump 398, 400, 402 and 404 which supplies one of the lubricant supply pipes as follows:

The pump 398 forces lubricant from drum 286 through a hose 406 to the pipe 364; pump 400, fed from the drum 288, supplies the pipe 370 through a hose 408; pump 402 forces lubricant from the drum 290 to the pipe 368 through a hose 410, and the pipe 366 is supplied with lubricant from the drum 292 by the pump 404 and a hose 412.

All of the above pumps supply lubricant under low pressure excepting the pump 400 attached to the drum 288. This latter pump is of the high pressure type, and supplies lubricant, for servicing high pressure fittings, to the guns 338 and 340.

In each of the compartments 280 and 284, a vertical air pipe 414 is positioned between the drums therein and is secured to the floor of the tower by a communicating manifold 416 and nut 418. Each of the two manifolds 416 is supplied with air from an air line 420, by pipe lengths 422 and 424. The top of each vertical pipe 414 has secured thereto a cross 426, the two side openings of which are connected to the pumps, by hose lengths 428, while a solid rod 430 is screwed into the top opening, and extends through a hole in the top of the cabinet, thereby lending support to the upstanding pipe 414.

For advertising purposes, I provide a neat and attractive sign 432, supported on posts 434. The two posts 434 are fabricated from sheet metal and are provided with sign receiving notches 436 on their upper adjacent edges. To hold the structure together and to give the sign a smart appearance, a border strip 438 of polished or plated metal covers the top edge of the sign 432, extends along the ends thereof, and into the hollow posts, where it is provided with an eye 440 in each end. A rod 442, having a hook 444 in one end, is hooked through the eye 440 and extends downwardly through the post 434 and into the top of the tower through a hole 446. The lower end of this rod 442 is threaded and provided with a nut 448.

If desired, the lower surface of the sign 432 may rest in a channel strip 450, which adds to the sign's distinctive appearance.

In assembling the sign and posts, the posts 434 are put in place on top of the tower, then the strips 450 and 438 are placed upon the proper edges of the sign 432 and the sign located with its ends in the notches 436. The rods 442 are hooked into the eyes 440, pushed through the holes 446, and drawn tight by the nuts 448. Thus, by tightening the two nuts 448, the sign 432, decorative strips 438 and 450, and posts 434, are all rigidly bound together and secured to the hose tower.

In use, the operator reaches over either side of the hose tower and grasps the gun dispensing the proper lubricant. The gun is lifted from its triangular cup and with its attached hose is withdrawn from the tower and carried to the automobile being serviced. When the lubricating operation has been completed, the gun is returned to its cup with its hose depending in the proper slot. The movement of the hose to and from the tower is eased by the freely rotatable roller 322 over which it passes.

When the lubricant in one of the drums becomes exhausted, the doors 382 are removed, the lubricant and air hoses disconnected from the pump, and the drum and pump removed from the cabinet. The pump is then placed in a new drum which is moved back into the cabinet where the hoses are reconnected. The doors are then replaced as previously described.

While I have described and illustrated two specific forms of my invention, I contemplate that many changes and substitutions may be made therefrom without departing from the scope of the following claims.

I claim:

1. In a hose tower, the combination comprising, a cabinet divided into a plurality of vertical compartments, means in the upper portion of said cabinet to support a plurality of lubricant dispensing devices, lubricant dispensing devices adapted to be supported in said supporting means, flexible hose lengths connected to said lubricant dispensing means and depending freely within the vertical compartments in said cabinet, and means connected to the opposite ends of said flexible hose to supply lubricant thereto, each of said compartments having a relatively long vertical slot in one wall thereof through which the lubricant dispensing device therein and the major portion of said flexible hose may be readily withdrawn and reinserted.

2. In a hose tower, the combination comprising, a cabinet divided into a plurality of vertical compartments, means in the upper portion of said cabinet to support a plurality of lubricant dispensing devices, lubricant dispensing devices adapted to be supported in said supporting means, flexible hose lengths connected to said lubricant dispensing means and depending within the vertical compartments in said cabinet, and means connected to the opposite ends of said flexible hose to supply lubricant thereto, each of said compartments having a relatively long vertical slot in one wall thereof through which the lubricant dispensing device therein and the major portion of said flexible hose may be readily withdrawn and reinserted, the slots of adjacent compartments being located in opposite walls of the cabinet and the hoses in adjacent compartments being arranged in overlapping relationship.

3. In a hose tower, the combination comprising, a cabinet divided into a plurality of vertical compartments, means in the upper portion of said compartments to support a plurality of lubricant dispensing devices, lubricant dispensing devices adapted to be supported in said supporting means, flexible hose lengths connected to said lubricant dispensing means and depending within the vertical compartments in said cabinet, and means connected to the opposite ends of said flexible hose to supply lubricant thereto, each of said compartments having a relatively long vertical slot in one wall thereof through which the lubricant dispensing device therein and the major portion of said flexible hose may be readily withdrawn and reinserted, one of said slots being in one wall of the cabinet and another of said slots being in an opposite wall of the cabinet whereby one hose is arranged in overlapping relationship to another hose.

4. In a hose tower, the combination comprising, a cabinet divided into a plurality of vertical compartments, means in said cabinet to support a plurality of lubricant dispensing devices, lubricant dispensing devices adapted to be supported in said supporting means, flexible hose lengths connected to said lubricant dispensing means and depending freely within the vertical compartments in said cabinet, and means connected to the opposite ends of said flexible hose to supply lubricant thereto, each of said compartments having a relatively long vertical slot in one wall thereof through which the lubricant dispensing device therein and the major portion of said flexible hose may be readily withdrawn and reinserted, the slots of alternate compartments being located in opposite walls of the cabinet and the hoses being alternately arranged and in overlapping relationship.

5. In a hose tower located above the ground, the combination comprising, means to support a plurality of lubricant dispensers within said tower, lubricant dispensers adapted to be supported within said supporting means, a hose length connected to each dispenser and to a lubricant supply means, each said hose length depending in a loop within a narrow vertical compartment in said tower, partitions forming said compartments and separating said hose lengths, said partitions being spaced closer together at one edge of each compartment whereby one edge of each compartment is narrower than the other, and a vertical slot in the wide edge of each compartment through which a lubricant dispenser and a portion of its attached hose may be laterally removed and laterally replaced.

6. In a hose tower located above the ground, the combination comprising, means to support a plurality of lubricant dispensers on opposite sides within said tower, lubricant dispensers adapted to be supported within said supporting means, hose lengths connected to said dispenser and to lubricant supply means, each said hose length depending in a loop within a vertical compartment in said tower, partitions forming said compartments and separating said hose lengths, adjacent partitions being canted with respect to each other and alternate partitions being substantially parallel whereby each compartment has a narrow edge and a wide edge, and a slot in the wide edge of each compartment providing for lateral withdrawal and lateral replacement of a lubricant dispenser and part of its attached hose.

7. In a hose tower, the combination comprising, a cabinet located above the ground and presenting a symmetrical exterior, means to support a plurality of lubricant dispensers on opposite sides within the cabinet, lubricant dispensers adapted to be supported in said supporting means, a hose length connected to each dispenser and to lubricant supply means, each said hose length depending in a loop within a vertical compartment in the cabinet, partitions extending substantially the width of the cabinet for forming said compartments and separating said hose lengths, alternate compartments containing hose lengths leading to dispensers on alternate sides of the cabinet, there being but one hose length in each compartment, and alternately arranged vertical slots in the edges of said compartments providing for lateral removal and lateral replacement of said lubricant dispensers.

8. In a hose tower located above the ground, a support for a plurality of lubricant dispensers, lubricant dispensers adapted to be supported in said supporting means, a hose length connected to each dispenser, each said hose length depending in a loop within a vertical compartment and having one end connected to a lubricant supply means, the several hose lengths being separated by partitions forming said compartments, and a vertically disposed slot in each compartment providing for lateral removal and lateral replacement of a lubricant dispenser and part of the hose attached thereto, said slots terminating a substantial distance above the bottom of said compartments whereby each compartment has a closed lower portion retaining the hose loops within the tower.

9. In a hose tower, the combination comprising, a compartment having closed side walls, said compartment being open at the top and divided into vertical slots by partitions, lubricant supply means in each said slot, hose lengths connected at one end to said lubricant supply means, said hose lengths depending in loops to the floor and having their opposite ends connected to lubricant dispensing guns, and cups in said slots to support said guns and catch the drippings therefrom.

10. In a hose tower, the combination comprising, a compartment having closed side walls, said compartment being open at the top and divided into vertical slots by partitions, lubricant supply means in each said slot, hose lengths connected at one end to said lubricant supply means, said hose lengths depending in loops to the floor and having their opposite ends connected to lubricant dispensing guns, cups in said slots to support said guns and catch the drippings therefrom, and horizontal rollers at the top of said cabinet to ease the inward and outward movement of said hose lengths.

WILLIS A. KROPP.